Aug. 5, 1952 R. S. LLEWELLYN 2,605,523
BELT CONNECTOR

Filed Feb. 3, 1945 2 SHEETS—SHEET 1

Inventor
Rossiter S. Llewellyn
BY
Carlson, Pitzner, Hubbard & Wolfe
Attorneys

Aug. 5, 1952　　　R. S. LLEWELLYN　　　2,605,523
BELT CONNECTOR
Filed Feb. 3, 1945　　　2 SHEETS—SHEET 2
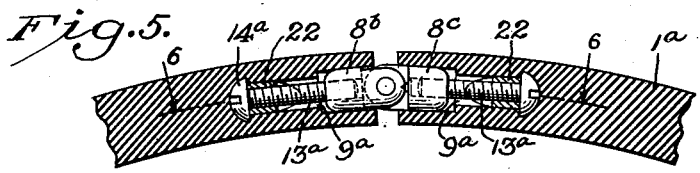
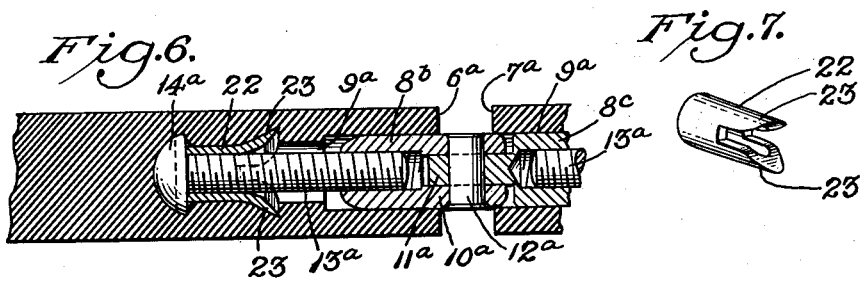
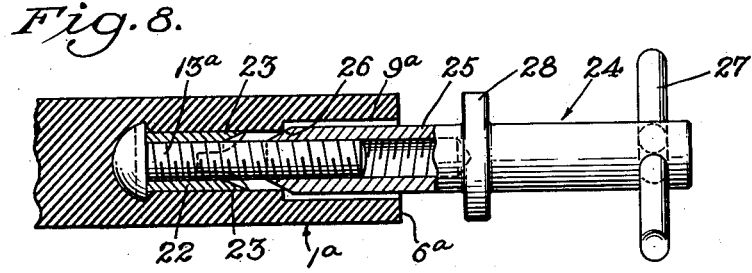
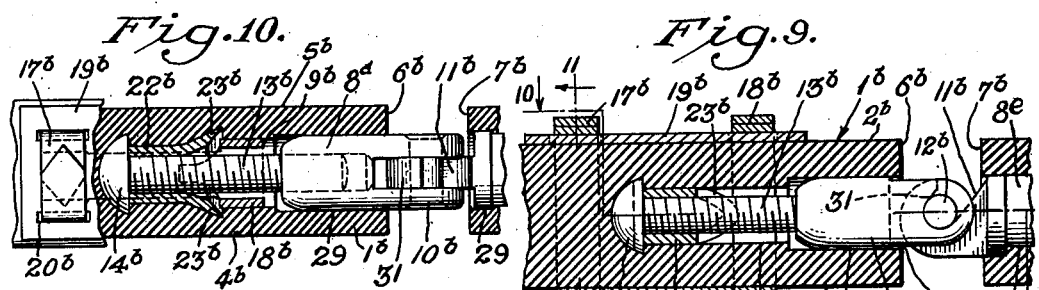
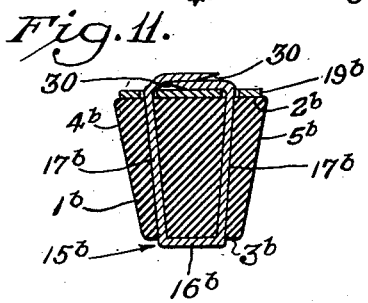
Inventor
Rossiter S. Llewellyn
By
Carlson, Pitzner, Hubbard & Wolfe
Attorneys.

Patented Aug. 5, 1952

2,605,523

UNITED STATES PATENT OFFICE 2,605,523

BELT CONNECTOR

Rossiter S. Llewellyn, Glen Ellyn, Ill., assignor to Armstrong-Bray & Co., Chicago, Ill., a corporation of Illinois Application February 3, 1945, Serial No. 576,077

7 Claims. (Cl. 24—33)

The present invention relates to improvements in belt connectors, and has particular reference to a new and improved connector for split V-belts.

One of the objects of the present invention is to provide a novel V-belt connector which will permit the advantageous use of split V-belts having separable ends, as distinguished from similar belts of the continuous type, thereby facilitating assembly about the driving and driven elements in positions that are inaccessible or not conveniently accessible.

Another object is to provide a new and improved V-belt connector which is selectively adjustable to effect alterations in the length of the belt, and thereby to permit the correct use of belts that are off-size and the equalization of the belts in a multiple-belt drive so that each belt will carry its proportionate load.

A further object is to provide a novel V-belt connector which does not objectionably impair the flexibility of the belt, and does not interfere with the frictional engagement of the sides of the belt with the driving and driven elements.

Another object is to provide a new and improved V-belt connector which is sturdy in construction, and convenient to assemble, thereby avoiding long shut-down periods to effect repairs in the event of belt breakage.

A further object is to provide a novel V-belt connector which permits belt repair, and the salvaging of broken belts to form belts of shorter standard lengths, thereby reducing belt cost.

Other objects and advantages will become apparent as the description proceeds.

In the accompanying drawings,

Fig. 5 is a view similar to Fig. 2, but illustrating a modified form of the conductor.

Fig. 6 is a longitudinal sectional view taken along line 6—6 of Fig. 5.

Fig. 7 is a perspective view of an anchor member forming part of the modified connector.

Fig. 8 is a sectional view illustrating the method of assembling the connector of Figs. 5 and 6.

Fig. 9 is an enlarged view similar to Fig. 2 of a second modified form of connector.

Fig. 10 is a sectional view taken along line 10—10 of Fig. 9.

Fig. 11 is a transverse sectional view taken along line 11—11 of Fig. 9.

Figure 1:
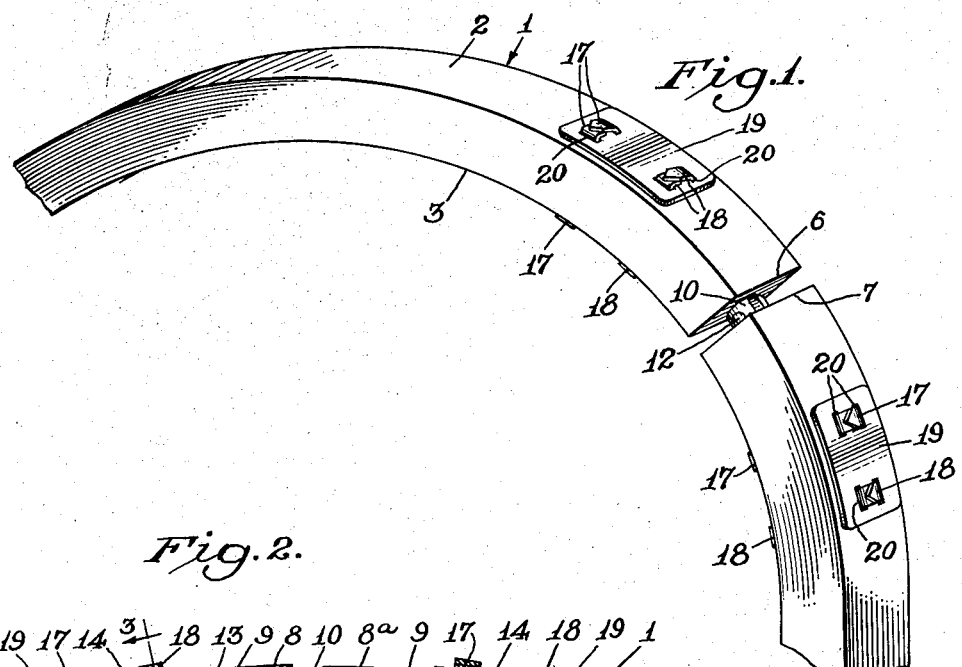
Figure 1 is a fragmentary perspective view of a split V-belt having a connector embodying the features of my invention.

Referring more particularly to the drawings, the belt connector constituting one exemplary embodiment of the invention is especially adapted for, and hence is shown in connection with, a conventional V-belt 1. The belt is tapered in cross section having an outer relatively wide face 2, an inner relatively narrow face 3, and opposite inclined friction surfaces 4 and 5 adapted for driving engagement with the driving and driven elements (not shown). The conventional V-belt is ordinarily continuous in form and provided in various stock lengths. In the present instance, the belt 1, instead of being continuous, is split to provide ends 6 and 7 adapted in use to be joined together by the connector forming the subject matter of the present invention. It will be understood that the belt 1 may be made of any suitable material, such for example as rubber composition, rubber impregnated fabric, or leather.

Generally stated, the belt connector comprises component elements 8 and 8a secured in and projecting from longitudinal holes or bores 9 formed respectively in the opposed ends 6 and 7 of the belt 1, and adapted to be flexibly and separably coupled at their outer projecting ends. As a result, the belt connector does not interfere with the friction grip of the side surfaces 4 and 5 with the driving and driven elements over which the belt is mounted.

The coupling elements 8 and 8a preferably consist of two cylindrical plugs which are partially inserted, with a snug fit, respectively in the outer ends of the bores 9, and are adjustably anchored therein to withstand the pull of the belt 1. The outer ends of the plugs 8 and 8a are pivotally articulated to provide a flexible joint. In the present instance, the outer end of the plug 8 is bifurcated to provide spaced parallel lugs 10, and the plug 8a is formed with a single lug 11 fitting between the lugs 10. A pivot pin 12 is removably inserted diametrically through the lugs 10 and 11 to complete the joint.

The means for anchoring the elements 8 and 8a respectively in the two bores 9 are alike, and hence a description of the means associated with the belt end 6 will suffice for both, the corresponding means associated with the belt end 7 being identified by the same reference numerals.

Figure 2:
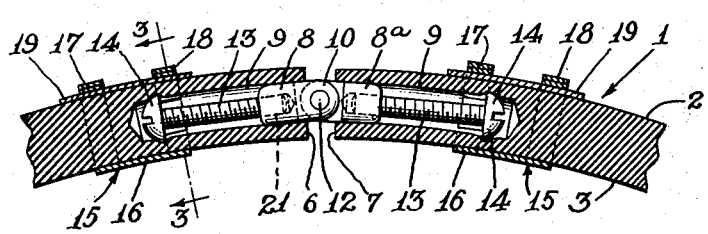
Fig. 2 is a fragmentary longitudinal sectional view of the belt taken through the connector in a medial plane between the opposite sides thereof.
Figure 3:
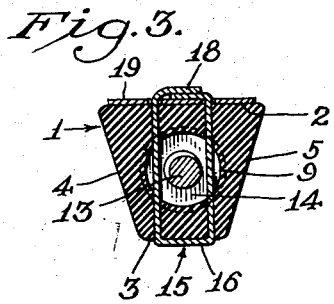
Fig. 3 is a transverse sectional view taken along line 3—3 of Fig. 2.
Figure 4:
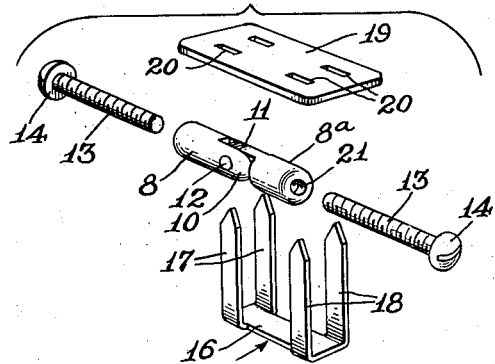
Fig. 4 is a perspective view illustrating the various elements of the connector in exploded relationship.

In the form of connecter illustrated in Figs. 1 to 4, an anchor bolt or screw 13 having a head 14 is inserted into the bore 9 in the belt end 6.

Preferably, the head 14 is slightly larger in diameter than the bore 9 so that when the bolt is forcibly inserted, with the threaded shank projecting outwardly, the head will have a snug fit and will be held against rotation. The threaded shank of the bolt is considerably smaller in diameter than the bore 9, and extends therethrough in peripherally spaced relation so that the bolt may tilt or swivel therein.

To anchor the bolt 13 within the inner end of the bore 9 with sufficient strength to resist the belt tension, the head 14 is engaged by a doublepronged staple, indicated generally at 15. More particularly, the staple 15 comprises an elongated narrow head or plate 16 formed at opposite ends respectively with two pairs or sets of spaced parallel pointed side prongs 17 and 18. The staple 15 is inserted through the belt 1, with the plate 16 positioned medially against the inner face 3, and with the prongs 17 and 18 projecting through to the outer face 2. Preferably, a flat rectangular clamping plate 19, having suitably spaced apertures 20 at the four corners to receive the outer projecting ends of the prongs 17 and 18, is positioned against the outer face 2 of the belt 1, and the ends of the prongs are clinched over the plate to secure the staple 15 in position. The prongs of each set are spaced apart a distance somewhat less than the diameter of the bore 9, and the staple 15 is located longitudinally of the belt 1 so that the one set of prongs 18 will project through opposite sides of the bore in position to engage the under face of the bolt head 14. Consequently, the staple 15 provides a positive anchor which serves to prevent the bolt 13 from pulling out of the bore 9 when the belt 1 is placed under driving tension.

The shank of the bolt 13 is adjustably threaded into an axial threaded bore 21 in the inner end of the associated coupling element or plug 8.

The belt connecter permits the use of V-belts which are not of the solid continuous type, but which are split and adapted to be connected at the ends when in use. The installation of V-belts of the continuous type is often difficult, and sometimes requires disassembly of the machine parts. The present belt with the separable connecter avoids this objection. It can be separated by removing the pin 12, then positioned about the driving and driven elements, and then reconnected by again inserting the pin. Unwarranted removal of the pin 12 may be guarded against by slightly riveting or upsetting the ends.

Continuous type belts are customarily provided in various stock sizes, but the lengths in a given lot are not always exactly uniform. The present belt connecter being adjustable by turning the coupling elements 8 and 8a on the bolts 13, permits convenient and accurate adjustment of the length of the belt, as for example where the belt is slightly off-size. This is particularly advantageous in a multiple belt drive, wherein each belt should assume its proportionate share of the load.

In case of belt breakage, the connecter permits quick and convenient repair so that relatively long periods of machine shut-down can be avoided. Also, belt cost is reduced since broken belts, even though somewhat shortened, can be repaired for use in installations where shorter belts are required. The belt material can be purchased in long strips or rolls, and sections to the desired length can be cut therefrom as required, thereby avoiding the necessity of keeping a large number of premade belts of the different stock sizes on hand or designing machinery or drives to accommodate stock belt lengths.

In general, the belt connecter does not interfere with the driving qualities of the belt. It does not project to the side friction surfaces, and does not objectionably impair the flexibility of the belt at the joint.

In the modified form of connector illustrated in Figs. 5 and 6, the split ends 6a and 7a of the belt 1a are formed with longitudinal bores 9a. Bolts 13a, with heads 14a, are inserted respectively in the bores 9a and project outwardly. Anchor elements or plugs 8b and 8c are threaded onto the outer ends of the shanks of the bolts 13a within the bores 9a, and the projecting ends have interfitting lugs 10a and 11a pivotally connected by a pin or rivet 12a. To this extent, the connector is the same as that shown in Figs. 1 to 4.

The modified form of connector employs different means for anchoring the heads 14a of the bolts 13a in the bores 9a. In this form, the anchoring means in each instance comprises a sleeve 22 which is disposed on the shank of the bolt 13a in position against the under face of the head 14a, and the outer end of which is longitudinally slit to define a plurality of annularly arranged prongs 23, preferably pointed at their ends.

In the assembly operation, an expander tool 24 is employed. The tool comprises an internally threaded tubular sleeve 25 which is inserted into the bore 9a and threaded onto the projecting shank of the bolt 13a. The inner end of the sleeve 25 is formed with a conical face 26 adapted to to engage the pointed ends of the prongs 23 and to spread the latter radially into the matrix of the surrounding wall of the bore 9a. The sleeve 25 is provided at the other end with an operating handle 27, and intermediate its ends with a stop collar 28 adapted for engagement with the end 6a of the belt 1a at the limit of inward movement. When the collar 28 is located against the end 6a of the belt, further rotation of the tool 24 serves to pull the bolt 13a outwardly and to force the prongs 23 into the material. The prongs 23 when spread serve to constrain the anchor sleeve 22 against outward movement, and thereby to confine the head 14a of the bolt 13a in position against the belt tension.

In the third form, illustrated in Figs. 9, 10 and 11, the belt connector comprises both a staple 15b and an anchor sleeve 22b for anchoring each of the bolts 13b in the respective bores 9 opening to the ends 6b and 7b of the belt 1b. Preferably, the outer ends of the bores 9b are formed with counterbores 29 to receive the coupling elements 8d and 8e. Referring to the belt end 6b, the sleeve 22b is disposed against the bolt head 14b, and the prongs 23b are flared outwardly into the material toward the side surfaces 4b and 5b. The forward prongs 18b of the staple 15b are inserted through the belt 1b in position forwardly to engage the flared ends of the prongs 23b so as to impart an added resistance to the outward pull on the bolt 13b. In the present instance, the prongs 17b at the other end of the staple 15b are sharpened on their inner sides, as indicated at 30, and are spread apart so that in penetrating the belt they will be spread out of line with the prongs 18b, and the rear set of apertures 20b in the clamping plate 19b is correspondingly spaced apart more than the forward set.

The coupling element 8d has spaced lugs 10b supporting a connecting pin 12b, but the intermediate lug 11ᵇ on the coupling member 8ᵉ, instead of being apertured as in the preceding forms, is provided with a hook 31 adapted to be releasably engaged about the pin. This permits the pin 12ᵇ to be fixed permanently in position. Preferably, the lug 11ᵇ with the hook 31 is of larger transverse section from the axis of the coupling element 8ᵉ toward the inner belt face 8ᵇ than it is toward the outer belt face so as to provide a comparatively heavy construction and still prevent the hook from projecting outwardly beyond the face 2ᵇ when the connector is flexed in passing over the sheaves.

I claim as my invention:

1. A belt connector for the ends of a split V-belt comprising, in combination, two screw bolts inserted respectively in longitudinal bores formed in and opening to the opposed ends of the belt, said bolts having enlarged heads at their inner ends and outwardly projecting shanks, two coupling elements inserted in and projecting outwardly from the outer ends of said bores and being threaded respectively on said shanks, a flexible joint connecting the outer ends of said coupling elements, and staples extending respectively through the belt ends, each staple having spaced prongs extending through opposite sides of the associated bore outwardly of the associated bolt head and acting to restrain the head against outward movement.

2. A belt connector for the ends of a split V-belt comprising, in combination, two screw bolts inserted respectively in longitudinal bores formed in and opening to the opposed ends of the belt, said bolts having enlarged heads at their inner ends and outwardly projecting shanks, two coupling elements inserted in and projecting outwardly from the outer ends of said bores and being threaded respectively on said shanks, a flexible joint connecting the outer ends of said coupling elements, and two staples for anchoring said screw bolts respectively within said bores, each staple having two sets of spaced prongs extending transversely through the associated belt end from the inner face to the outer face and entirely between the friction sides, the forward set of prongs extending through opposite sides of the associated bore in position to engage the underside of the associated bolt head.

3. A belt connector for the ends of a split V-belt comprising, in combination, two screw bolts inserted respectively in longitudinal bores formed in and opening to the opposed ends of the belt, said bolts having enlarged heads at their inner ends and outwardly projecting shanks, two coupling elements inserted in and projecting outwardly from the outer ends of said bores and being threaded respectively on said shanks, a flexible joint connecting the outer ends of said coupling elements, two staples for anchoring said screw bolts respectively within said bores, each staple having two sets of spaced prongs extending transversely through the associated belt end from the inner face to the outer face and entirely between the friction sides, the forward set of prongs extending through opposite sides of the associated bore in position to engage the underside of the associated bolt head, and a clamping plate located against the outer face of each belt end and having apertures to receive the projecting ends of the associated prongs, said prongs being bent over against said plate.

4. A belt connector for the ends of a split V-belt comprising, in combination, two screw bolts inserted respectively in longitudinal bores formed in and opening to the opposed ends of the belt, said bolts having enlarged heads at their inner ends and outwardly projecting shanks, two coupling elements inserted in and projecting outwardly from the outer ends of said bores and being threaded respectively on said shanks, a flexible joint connecting the outer ends of said coupling elements, and two anchor sleeves disposed respectively on said bolt shanks against said heads within said bores, the outer end of each sleeve being formed with peripherally spaced prongs spread outwardly at their free ends into the peripheral wall of the associated bore.

5. A belt connector for the ends of a split V-belt comprising, in combination, two screw bolts inserted respectively in longitudinal bores formed in and opening to the opposed ends of the belt, said bolts having enlarged heads at their inner ends and outwardly projecting shanks, two coupling elements inserted in and projecting outwardly from the outer ends of said bores and being threaded respectively on said shanks, a flexible joint connecting the outer ends of said coupling elements, two staples for anchoring said screw bolts respectively within said bores, each staple having two sets of spaced prongs extending transversely through the associated belt end from the inner face to the outer face and entirely between the friction sides, the forward set of prongs extending through opposite sides of the associated bore in position to engage the underside of the associated bolt head, the other set of prongs being sharpened on their inner faces and diverging from each other.

6. A belt connector for the ends of a split V-belt comprising, in combination, two screw bolts inserted respectively in longitudinal bores formed in and opening to the opposed ends of the belt, said bolts having enlarged heads at their inner ends and outwardly projecting shanks, two coupling elements inserted in and projecting outwardly from the outer ends of said bores and being threaded respectively on said shanks, a flexible joint connecting the outer ends of said coupling elements, two anchor sleeves disposed respectively on said bolt shanks against said heads within said bores, the outer end of each sleeve being formed with peripherally spaced prongs spread outwardly at their free ends into the peripheral wall of the associated bore, and two staples extending through said belt ends, each staple having a set of spaced prongs extending through opposite sides of the associated bore and located for engagement by the spread ends of said first mentioned prongs.

7. A belt connector for the ends of a split V-belt comprising, in combination, two screw bolts inserted respectively in longitudinal bores formed in and opening to the opposed ends of the belt, said bolts having enlarged heads at their inner ends and outwardly projecting shanks, two coupling elements inserted in and projecting outwardly from the outer ends of said bores and being threaded respectively on said shanks, a flexible joint connecting the outer ends of said coupling elements, two anchor sleeves disposed respectively on the bolt shanks against said heads within said bores, the outer end of each sleeve being formed with two side prongs adapted to be flared apart toward the sides of the belt into penetration with the surface of the associated bore, and two staples extending respectively through said belt ends, each staple having a set of spaced prongs extending through opposite sides of the associated bore from the inner face to the outer face and entirely between the friction sides of the belt and being located for engagement by the flared ends of said first mentioned prongs.

ROSSITER S. LLEWELLYN.

REFERENCES CITED

The following references are of record in the file of this patent:

UNITED STATES PATENTS

| Number | Name | Date |
|---|---|---|
| 27,906 | Howard | Apr. 17, 1860 |
| 207,903 | Sirois | Sept. 10, 1878 |
| 391,695 | Eastwood | Oct. 23, 1888 |
| 691,885 | Abney | Jan. 28, 1902 |
| 943,168 | Shufflebottom et al. | Dec. 14, 1909 |
| 1,224,498 | Petersen | May 1, 1917 |
| 1,482,461 | Diehl | Feb. 5, 1924 |
| 1,733,279 | Shutts | Oct. 29, 1929 |
| 1,874,628 | Roderwald | Aug. 30, 1932 |
| 1,970,618 | Olsen | Aug. 21, 1934 |
| 2,003,987 | Amantea | June 4, 1935 |
| 2,111,053 | Olsen | Mar. 15, 1938 |
| 2,263,954 | Pollard | Nov. 25, 1941 |
| 2,327,831 | Sutton | Aug. 24, 1943 |
| 2,367,834 | Kuhn | Jan. 23, 1945 |

FOREIGN PATENTS

| Number | Country | Date |
|---|---|---|
| 299,556 | Germany | Aug. 11, 1917 |
| 101,016 | Switzerland | Sept. 1, 1923 |
| 14,975 | Great Britain | 1908 |
| 61,494 | Germany | Mar. 15, 1892 |
| 613,142 | Germany | May 11, 1935 |
| 11,887 | Switzerland | Mar. 12, 1896 |
| 199,449 | Great Britain | June 20, 1923 |
| 539,649 | Great Britain | Sept. 18, 1941 |
| 624,085 | France | Nov. 30, 1928 |
| | (1st. Addition No. 34,186) | |